United States Patent [19]
Lindsay, Jr. et al.

[11] Patent Number: 5,646,794
[45] Date of Patent: Jul. 8, 1997

[54] METAL DETECTION APPARATUS FOR DETECTING METAL OBJECTS IN A WEB OF PHOTOGRAPHIC MATERIAL

[75] Inventors: Kenneth Alan Lindsay, Jr., Brockport; Joseph Stanley Jastrzembski, Rochester, both of N.Y.

[73] Assignee: Eastman Kodak Company, Rochester, N.Y.

[21] Appl. No.: 566,326

[22] Filed: Dec. 1, 1995

Related U.S. Application Data

[60] Provisional application No. 60/004,407, Sep. 27, 1995.
[51] Int. Cl.⁶ .................................................. G08B 21/00
[52] U.S. Cl. .................. 360/3; 242/563; 340/675; 396/652
[58] Field of Search ................ 360/1, 3, 74.7; 242/333, 333.1, 333.2, 563; 226/45, 91, 92; 340/675; 396/568, 651, 652; 156/502, 506

[56] References Cited

U.S. PATENT DOCUMENTS

| | | | |
|---|---|---|---|
| T958,003 | 5/1977 | Russel et al. | 227/1 |
| 3,248,979 | 5/1966 | Stevens, Jr. | |
| 3,564,170 | 2/1971 | Rehm et al. | |
| 3,646,372 | 2/1972 | Snellman et al. | |
| 4,276,547 | 6/1981 | Bowen et al. | |
| 4,523,750 | 6/1985 | Hubler | |
| 5,087,027 | 2/1992 | Acquaviva | 340/675 X |
| 5,555,141 | 9/1996 | Min | 360/74.7 |

OTHER PUBLICATIONS

Japanese 1213761A; Publication No. 01-213671; Published Aug. 28, 1989; Yushimo Hisahide; Ricoh Co. Ltd.; Abstract.

*Primary Examiner*—W. R. Young
*Assistant Examiner*—James L. Habermehl
*Attorney, Agent, or Firm*—Frank Pincelli

[57] ABSTRACT

A photofinishing apparatus for reading and/or writing magnetic information on a web of photographic film. The web comprises a plurality of individual strips of film secured together end to end. The apparatus includes a film track for receiving the web, a pair of drive rollers for moving the film web through the film track, a magnetic reader and/or writer for reading and/or writing magnetic data on the web, and a detection device for detecting metal objects in the web. The detection device is located at a point in the film track prior to the magnetic reader and/or writer. A monitoring device monitors the change in voltage across two space points on the film track for determining when a metal object is in the web and for producing a signal which is used to stop the film web.

16 Claims, 4 Drawing Sheets

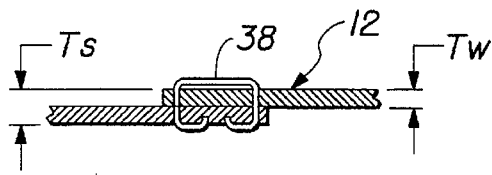
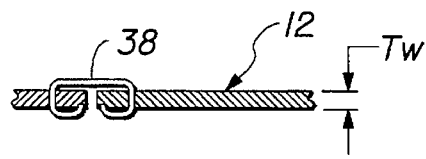
FIG.3a
FIG.3b
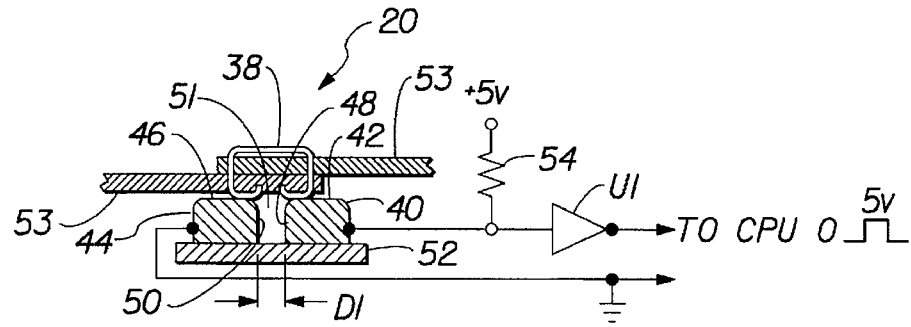
FIG.4
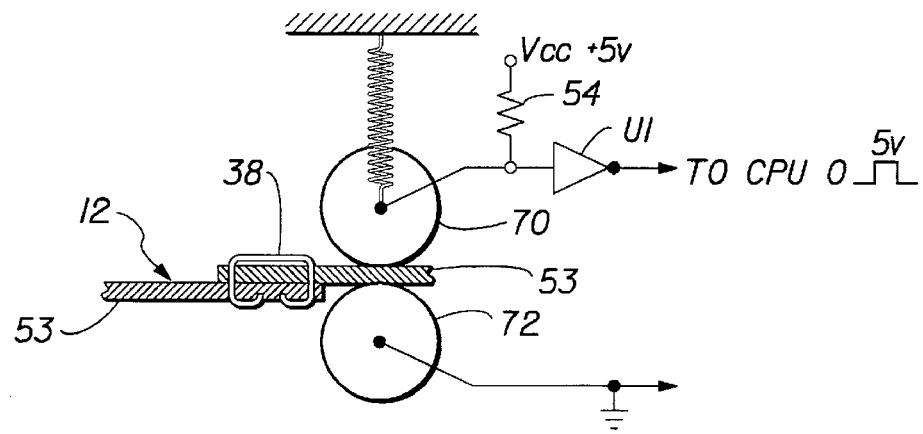
FIG.6
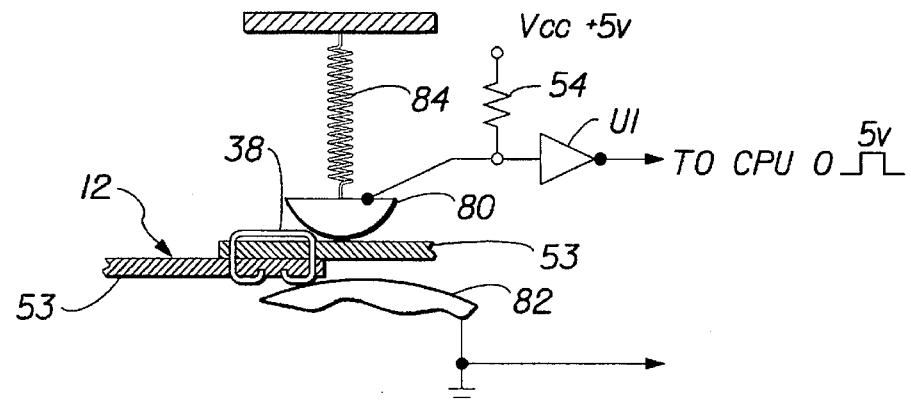
FIG.7

5,646,794

1

METAL DETECTION APPARATUS FOR DETECTING METAL OBJECTS IN A WEB OF PHOTOGRAPHIC MATERIAL

CROSS REFERENCE TO RELATED APPLICATION

Reference is made to and priority claimed from U.S. Provisional application Ser. No. 60/004,407, filed 27 Sep. 1995, entitled METAL DETECTION APPARATUS FOR DETECTING METAL OBJECTS IN A WEB OF PHOTOGRAPHIC MATERIAL.

FIELD OF THE INVENTION

The present invention relates to detecting metal objects in webs and, more particularly, for detecting metal staples used to hold broken ends of a filmstrip in a photofinishing process.

BACKGROUND OF THE INVENTION

In the photofinishing of photosensitive material, reels of heat-spliced undeveloped filmstrips are run through high speed, chemical film processors in a light-tight environment. Occasionally, the film web breaks in the processing apparatus, sounding an alarm to the operator. The operator then quickly splices the broken end together with metal staples so as not to affect the chemical processing of the film and productivity. At the output of the machine, the processed web is again wound on a reel to be used in other photofinishing devices, for example, a printer. Usually the metal staples are removed from the reel and a heat-splice is inserted in its place, thus preventing any damage to downstream devices, such as printers, finishing stations, etc. On occasion, the staples are not removed, in which case, an automatic detection scheme is needed to detect a staple in the downstream device and stop the film web before the staples do damage to the downstream device. This problem has become even more critical with respect to recently developed film containing magnetic information thereon. An example of such films are disclosed in U.S. Pat. Nos. 4,933,780 and 5,016,030. Typically, devices are used to either read and/or write information onto a thin magnetic layer provided on the film. These magnetic devices are very sensitive, and can be damaged easily by the passing of a staple across the surface. An example of downstream a device is the film prep workstation disclosed and described in U.S. Ser. No. 08/394,533, filed Feb. 17, 1995, entitled FILM PREPARATION WORKSTATION, by Bradley C. DeCook and Thomas J. Murray. Magnetic read/write devices may also be placed in various printers and finishing devices for providing information and/or reading information therefrom. Thus, it has become even more important to detect the staples prior to the insertion of the film into the device. In addition, it is important that the method used for detecting the staples not interfere with the devices used. Because of the close proximity of the magnetic read and/or write heads, it is important that the staple detection mechanism have low EMI noise so as to not interfere with the magnetic write and/or read heads.

Present methods of detecting staples in spliced filmstrips require a mechanical set-up gap to monitor the thickness of the film as it passes therethrough. The setting for the gap must be set for the smallest anticipated film plus staple dimension, so as to mechanically stop the film motion. However, misalignment of the detector permits staples to pass, which may result in damage to downstream devices.

The present invention provides a low cost, reliable method for monitoring metallic staples in a web, which also produces low EMI noise, thereby minimizing any potential interference with other electrical devices that may be present.

SUMMARY OF THE INVENTION

A photofinishing apparatus for reading and/or writing magnetic information on a web of photographic film. The web comprises a plurality of individual strips of film secured together end to end. The apparatus comprising:

a film track for receiving the web;

means for moving the film web through the film track;

magnetic reader and/or writer for reading and/or writing magnetic data on the web; and a detection device for detecting metal objects in the web, the detection device being located at a point in the film track prior to the magnetic reading device, means for monitoring the change in voltage across two space points on the film track for determining when the metal object is in the web, means for producing a signal when a change in voltage is detected, and means responsive to the signal for stopping the means for moving the film web along the film track.

DESCRIPTION OF THE DRAWINGS

FIGS. 3A and 3B are enlarged cross-sectional views of how the film web is spliced together using a staple;

FIG. 4 is an enlarged partial schematic view of the sensor of FIG. 2 used to detect staples;

FIG. 6 is an alternate embodiment of the sensor for detecting staples made in accordance with the present invention; and FIG. 7 is a schematic illustration of yet another embodiment with a sensor made in accordance with the present invention.

DETAILED DESCRIPTION OF THE INVENTION

Figure 1:
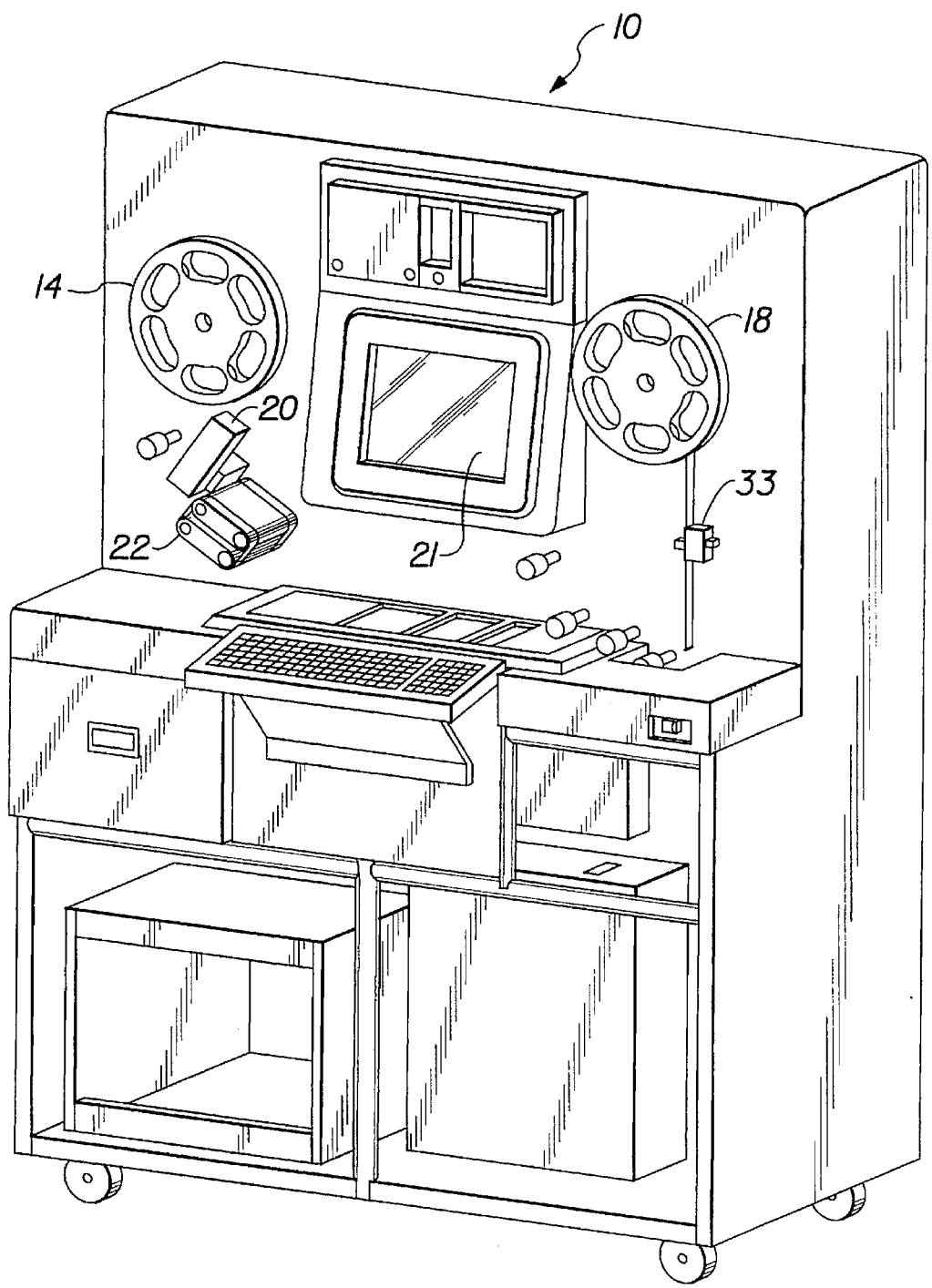
FIG. 1 is a perspective view of an apparatus made in accordance with the present invention.
Figure 2:
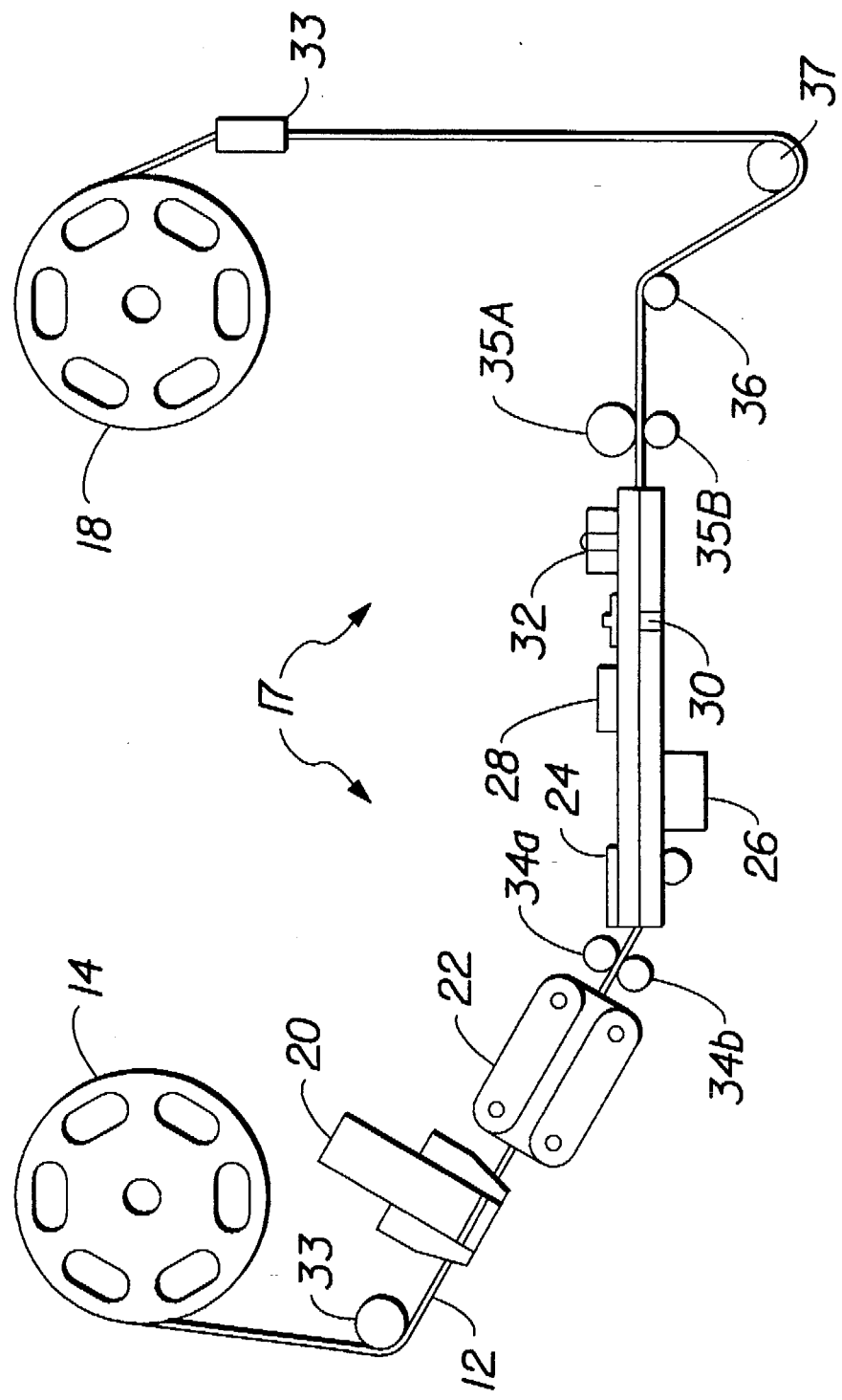
FIG. 2 is an enlarged partial schematic view of the film handling system of the device of FIG. 1.

Referring to FIGS. 1 and 2, there is illustrated a photographic film preparation workstation 10 for supplying magnetically encoded film data, optically encoded film data, and film image scan computational data for use in a high speed photographic printer (not shown). The workstation 10 also provides color corrected and formatted RGB data for use by the printer. It will also become apparent that the data obtained by the workstation 10 can be supplied to service printers, optical/magnetic index printers, photo CD writers, and additional downstream devices found inside and outside a photofinishing lab.

A further detailed description of the film prep workstation may be found in pending U.S. Ser. No. 08/394,533, filed Feb. 17, 1995, entitled FILM PREPARATION WORKSTATION, by Bradley C. DeCook and Thomas J. Murray. This application is hereby incorporated into this application in its entirety. A film prep workstation is designed to receive film for reading data therefrom and/or writing various data thereon and taking this data and supplying to additional photofinishing devices, either via floppy disk or via Internet connection. A web 12 comprising a plurality of individual filmstrips spliced together is provided on a supply reel 14 and routed through the film prep workstation by a film track 17 and is wound back onto a take-up reel 18. The film track 17 includes a staple detection device 20, a cleaning device 22, a splice barcode reader 26, a film code reader 28, a magnetic reader 30 and a film scanner 32. An optional magnetic writer 33 is provided for writing information magnetically on the filmstrips which form web 12. Appropriate means for moving and guiding the web 12 through the film track is provided. In the embodiment illustrated, guide rollers and drive rollers 34a,34b,35a, 35b,36,37 are provided for guiding and driving the filmstrip through the film track. However, it is to be understood that any appropriate drive mechanism may be provided for transporting of the film web 12 through the apparatus.

Referring to FIGS. 3A and 3B, there is illustrated two various methods by which metal staples may be provided in the web 12. In particular, referring to FIG. 3A, there is illustrated an overlap splice wherein the staple 38 is placed through two layers of film that have been placed on top of each other. As can be seen, the thickness Ts in the area of the splice is substantially greater than the thickness Tw of the web 12.

Referring to FIG. 3B, there is illustrated a butt splice provided in web 12. In this embodiment, the thickness Ts of the splice is only slightly larger than the thickness Tw of the film. As can be seen, the staple 38 is a generally C-shaped configuration, with the ends of the C curling in upon itself.

Figure 5:
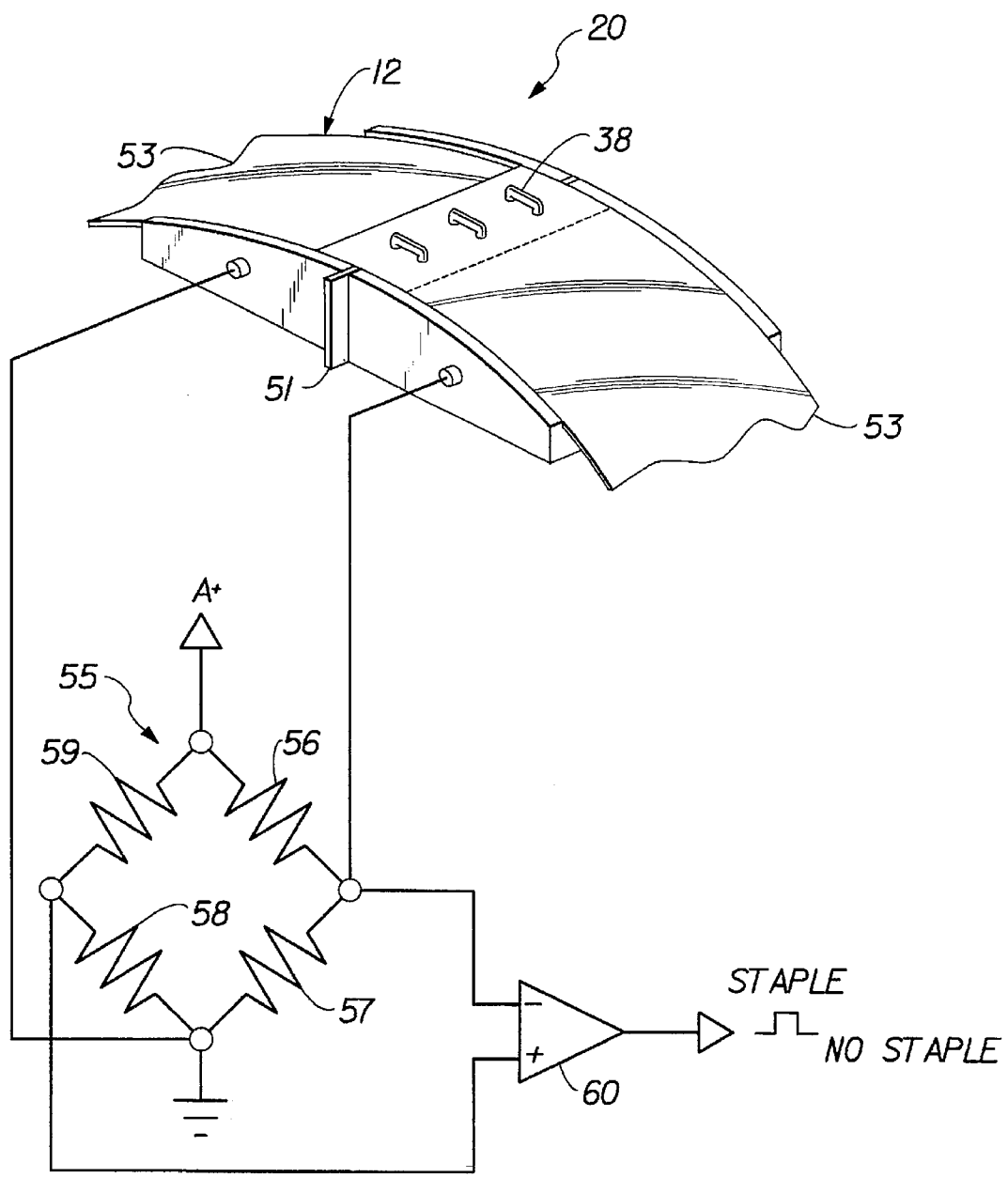
FIG. 5 is a partial perspective view of the sensor of FIG. 4.

Referring to FIGS. 4 and 5, there is illustrated in greater detail a portion of the staple detection device 20. A portion of web 12 is shown which includes a pair of adjacent filmstrips 53 secured together by three staples 38. The device 20 includes a first member 40 having a web contact surface 42 and a second member 44 having a second contact surface 46 for contacting web 12. The first and second members 40,44 having vertical surfaces 48,50 spaced apart by a distance D1 so as to form gap 51. In the preferred embodiment illustrated, the first and second members are made of an electrically conducting material and are separated by an insulator 52, which is made of a non-electrically conducting material. The first member 40 is connected to a supply voltage through resistor 54. In the particular embodiment illustrated, the resistor 54 is 1K ohms and the voltage applied to the first member is +5 volts. The second member 44 is connected to ground and, thus the difference in voltage between the first and second member would be 5 volts. Appropriate means are provided for monitoring the difference in voltage between the first and second members 40,44 and producing a logic signal which is forwarded to a microprocessor (CPU) or control unit (not shown) when a predetermined change in voltage occurs. In the particular embodiment illustrated in FIG. 4, this monitoring of the voltage is accomplished a conventional logic device U1 (e.g., a SN74ALS04Hex Inverter) and in FIG. 5 by use of a balancing circuit 55. In the embodiment illustrated in FIG. 5, balancing circuit 55 comprises resistors 56,57,58,59 and comparator 60. The circuit 55 is designed such that when a voltage change occurs, the comparator 60 will be able to determine whether a staple 38 is present or not present across the gap 51 between members 40,44. The distance D1 of gap 51 is preferably as small as possible, yet sufficiently large as to prevent direct electrical contact between the first and second members 40,44. In the particular embodiment, the gap 51 is approximately 0.010 inches (0.254 mm). The signal produced by logic device U1 or comparator 60 is sent to the CPU (not shown), which as previously discussed controls the operation of the device 10. The CPU would disengage the web drive mechanism, which in the embodiment illustrated is the drive rollers, so as to stop movement of the web 12. Additionally, in the preferred embodiment illustrated, the CPU initiates an appropriate device (not shown) for providing an audible and/or visual indication of the problem, for example, an audio alarm or visual message displayed on a CRT or other display device.

Referring to FIG. 6, there is illustrated an alternate embodiment of the present invention, like numerals representing like parts, as previously described. In this embodiment a pair of conducting rollers 70,72 are provided, which are connected to a source of voltage and logic device U1. In this embodiment, at least one of the rollers 70,72 is spring loaded so as to bias the rollers 70,72 toward each other, such that when a staple 38 passes therethrough, a voltage differential will be formed between the rollers 70,72, thus providing a signal from the comparator for controlling the motion control mechanism of the device.

Referring to FIG. 7, there is illustrated yet another modified embodiment of the present invention, like numerals representing like parts, as previous described. In this embodiment, the first member 40 is replaced by a spring loaded shoe 80 biased by spring 84, which is insulated from and mounted to the device 20. Web 12 is urged against a second member 82 such that when a staple 38 passes therebetween, a voltage differential will be provided much in the same way as discussed with the previous embodiment.

It is to be understood that various other changes or modifications may be made without departing from the scope of the present invention. The present invention being limited by the claims that follow.

Parts List

10 ... workstation
12 ... web
14 ... supply reel
17 ... film track
18 ... take-up reel
20 ... staple detection device
22 ... cleaning device
26 ... barcode reader
28 ... film code reader
30 ... magnetic reader
32 ... film scanner
33 ... magnetic writer 34a,34b,35a,35b,36,37 ... guide rollers/drive rollers
38 ... staples
40 ... first member
42 ... web contact surface
44 ... second member
46 ... second contact surface
48,50 ... vertical surfaces
51 ... gap
52 ... insulator
53 ... filmstrips
54 ... resistor
55 ... balancing circuit
56,57,58,59 ... resistors
60 ... comparator
70,72 ... conducting rollers
80 ... spring loaded shoe
82 ... second member
84 ... spring

We claim:

1. A photofinishing apparatus for reading and/or writing magnetic information on a web of photographic film, said web comprising a plurality of individual strips of film secured together end to end; said apparatus comprising:

a film track for receiving the web;

means for moving the film web through the film track;

a magnetic reader and/or writer for reading and/or writing magnetic data on the web; and a detection device for detecting metal objects in said web, said detection device being located at a point in the film track prior to said magnetic reader and/or writer, said detection device comprising means for monitoring the change in voltage across two space points on said film track for determining when the metal object is in said web, means for producing a signal when a change in voltage is detected, and means responsive to said signal for stopping said means for moving the film web along the film track.

2. The apparatus according to claim 1 wherein said means for monitoring the change of voltage comprises:

a first member having a conductive web contact surface;

a second member having a second conductive web contact surface, said first and second members being spaced apart so as to form a gap therebetween and are electrically insulated from each other.

3. A device according to claim 2 wherein said monitoring means further includes means for applying a voltage across said first and second web contact surfaces of said first and second members.

4. A device according to claim 3 wherein said means for producing a signal comprises a balancing circuit placed across said first and second members and a comparator for determining the difference in voltage across said first and second members.

5. A device according to claim 3 wherein said means for producing a signal comprises a logic unit for producing a logic signal to a microprocessor or control unit.

6. A device according to claim 1 further comprising a signal indicating that a metal object has been detected in said web.

7. A device according to claim 6 wherein said signal is an audible signal.

8. A device according to claim 6 wherein said signal is a visual display.

9. A photofinishing apparatus for processing a plurality of individual strips of film secured together end to end, said apparatus comprising:

a film track for receiving the web;

means for moving the film web through the film track; and a detection device for detecting metal objects in said web, said detection device being located at a predetermined location in the film track, said detection device comprising means for monitoring the change in voltage across two space points on said film track for determining when the metal object is in said web, means for producing a signal when a change in voltage is detected, and means responsive to said signal for stopping said means for moving the film web along the film track.

10. An apparatus according to claim 9 wherein said means for monitoring the change of voltage comprises:

a first member having a conductive web contact surface; and a second member having a second conductive web contact surface, said first and second members being spaced apart so as to form a gap therebetween and are electrically insulated from each other.

11. A device according to claim 9 wherein said monitoring means further includes means for applying a voltage across said first and second web contact surfaces of said first and second members.

12. A device according to claim 11 wherein said means for producing a signal comprises a balancing circuit placed across said first and second members and a comparator for determining the difference in voltage across said first and second members.

13. A device according to claim 11 wherein said means for producing a signal comprises a logic unit for producing a logic signal to a microprocessor or control unit.

14. A device according to claim 9 further comprising a signal indicating that a metal object has been detected in said web.

15. A device according to claim 14 wherein said signal is an audible signal.

16. A device according to claim 14 wherein said signal is a visual display.

* * * * *